United States Patent [19]
Duret

[11] Patent Number: 5,749,333
[45] Date of Patent: May 12, 1998

[54] TWO-STROKE INTERNAL-COMBUSTION ENGINE DEPOLLUTION PROCESS AND ASSOCIATED APPLICATIONS

[75] Inventor: Pierre Duret, Sartrouville, France

[73] Assignee: Institute Francais du Petrole, Rueil-Malmaison, France

[21] Appl. No.: 709,329

[22] Filed: Sep. 5, 1996

[30] Foreign Application Priority Data

Sep. 8, 1995 [FR] France ................. 95 10797

[51] Int. Cl.$^6$ ................. F02B 17/00; F02P 5/04
[52] U.S. Cl. ................. 123/295; 123/73 C; 123/406; 123/416
[58] Field of Search ................. 123/65 R, 73 C, 123/295, 305, 406, 415, 416, 417; 60/285

[56] References Cited

U.S. PATENT DOCUMENTS

| | | | |
|---|---|---|---|
| 3,734,069 | 5/1973 | Akiyama et al. | 123/305 |
| 4,111,010 | 9/1978 | Minami | 60/285 X |
| 5,050,551 | 9/1991 | Morikawa | 123/305 |

FOREIGN PATENT DOCUMENTS 2238351  5/1991  United Kingdom.

OTHER PUBLICATIONS

Patent Abstracts of Japan, vol. 003, No. 097 (M–069), Aug. 17, 1979 & JP-A-54 072334 (Fuji Heavy Ind. Ltd.), Jun. 9, 1979.

Sae Techn. Papers SAE720195—1972, pp. 704–722, XP002003646, Glichi Yamagishi, et al; "A Study of Two–Stroke Cycle Fuel Injection Engines for Exhaust Gas Purification".

*Primary Examiner*—Tony M. Argenbright
*Attorney, Agent, or Firm*—Antonelli, Terry, Stout, & Kraus, LLP

[57] ABSTRACT

The present invention relates to a two-stroke internal-combustion engine depollution process including a separate and deferred delivery of fuel in relation to the air used to scavenge the burned gases, and having an advanced ignition delay with respect to optimal advanced ignition. According to the invention, the delay is such that it allows the exhaust gas temperature to increase and to create a post-oxidation of the unburned hydrocarbons contained in the exhaust gases, the post-oxidation sparing the use of a specific catalyst at the exhaust. Preferably, the delay is achieved in a stabilized-speed operating range of the engine.

11 Claims, 3 Drawing Sheets

TWO-STROKE INTERNAL-COMBUSTION ENGINE DEPOLLUTION PROCESS AND ASSOCIATED APPLICATIONS

FIELD OF THE INVENTION

The present invention relates to the field of spark-ignition two-stroke internal-combustion engines with a certain ignition advance in relation to the Top Dead Center (TDC) so as to optimize combustion in given operating ranges.

BACKGROUND OF THE INVENTION

In this field, an important problem lies in the pollution notably due to unburned hydrocarbon emissions. It is well-known that such emissions are mainly created by direct short-circuiting of the fresh mixture (that has not burned during combustion) to the exhaust during the phase known as scavenging phase. Theoretically, during this scavenging phase, at the end of the combustion, part of the fuel mixture scavenges the combustion chamber so as to drive the burned gases out of the chamber, towards the exhaust.

A proportion of this fresh mixture, often ranging between 30 and 50%, is then directly short-circuited to the exhaust without being burned.

In order to overcome this major drawback, a great number of solutions have been proposed. All the known solutions are aimed at separating and at delaying the fuel feed in relation to the supply of air used for scavenging the burned gases.

The solutions selected may consist in a stratification of richer fresh gases in relation to poorer and more greatly short-circuited fresh gases: U.S. Pat. No. 5,007,384 describes such a process.

Unburned hydrocarbon emissions can also be reduced through scavenging of the burned gases by fresh air (uncarbureted) and direct fuel injection into or just upstream from the combustion chamber: patent FR-2,575,522 discloses such a pneumatic fuel injection system.

Effectiveness of the separation of the fuel from the burned gases is more or less great according to the processes used. In each case, effectiveness is never complete.

It is thus recognized that, according to the effectiveness of the device allowing separate and delayed fuel delivery in relation to the scavenging, the exhaust gas will contain a more or less large amount of unburned hydrocarbons. However, even with a minimum effectiveness, it is possible to obtain an exhaust gas composition that comprises excess air and oxygen in relation to the fuel. In fact, if the scavenging air is more greatly short-circuited than the fuel (or the air-fuel mixture), that is introduced separately, and provided that the total air admitted plus fuel overall mixture is not excessively rich, the air-fuel mixture present at the exhaust and resulting from the short-circuiting will always be lean.

The unburned fuel present at the exhaust thus being associated with excess air, it may then be oxidized and converted into $CO_2$ and $H_2O$ with a suitable exhaust gas processing system. This system generally consists of a catalytic muffler impregnated with precious metals.

Another solution, in accordance with the present invention, may consist in delaying the time of the ignition advance. This solution was already briefly mentioned in a document entitled "A study of two-stroke cycle fuel injection engines for exhaust gas purification", published in 1972 by the SAE (Society of Automotive Engineers—USA) under number SAE 720,195.

SUMMARY OF THE INVENTION

The object of the present invention is to improve the latter type of depollution by oxidation of the unburned hydrocarbons present at the exhaust.

The process according to the invention thus applies to two-stroke internal-combustion engines comprising separate and delayed fuel delivery in relation to the air used for scavenging the burned gases, and comprising an advanced ignition delay.

According to the invention, the advanced ignition delay in relation to a so-called optimal advanced ignition (i.e. providing the highest combustion efficiency) is such that it allows to increase the temperature of the exhaust gases and to create a post-oxidation of the unburned hydrocarbons contained in said exhaust gases, said post-oxidation sparing the use of a specific catalyst at the exhaust.

In other words, according to the invention, the time of the ignition advance is sufficiently delayed so that, at the time of the opening of the exhaust port(s), the burned gases still are at a high temperature capable of oxidizing the unburned hydrocarbons present in the exhaust. This solution allows not to set a specific catalyst at the exhaust.

According to another aspect of the invention, said delay is preferably achieved in a stabilized-speed operating range of the engine.

Besides, the process according to the invention may also consist in varying the air/fuel ratio or the injection time of the fuel in relation to said delay.

The delay may be controlled mechanically or electronically. In the latter case, the control can be regulated by the exhaust gas temperature.

A particular application of the invention can relate to two-wheeler vehicles without a gearbox, for which the process is also implemented close to the maximum power and for high engine speeds.

Without departing from the scope of the invention, the depollution process can also be implemented in two-wheeler vehicles having a multiple-gear ratio gearbox, the process being then mainly implemented for low speeds and powers, corresponding to a particular use of the vehicle.

BRIEF DESCRIPTION OF THE DRAWINGS

Other details, features and advantages of the present invention will be clear from reading the description hereafter, given by way of non limitative examples, with reference to the accompanying drawings in which.

DESCRIPTION OF THE INVENTION

It is well-known that natural post-oxidation controlled by advanced ignition can present drawbacks. In fact, advanced ignition delay degrades the torque and therefore engine performances.

The present invention advantageously allows to limit natural post-oxidation operation in the commonest operating ranges of the engine, i.e. the stabilized speed ranges, and not to use this strategy around the maximum torque range of the engine, that can thus keep the whole of the instantaneous acceleration capacities thereof.

The advantage of this feature is a maximum hydrocarbon and carbon monoxide depollution, without requiring a catalyst in the most commonly used operating range of the engine, which is very often the operating range subject to anti-pollution regulations.

Besides, the process according to the invention allows the engine to keep the acceleration capacities thereof for shorter transient phases.

Figure 1:
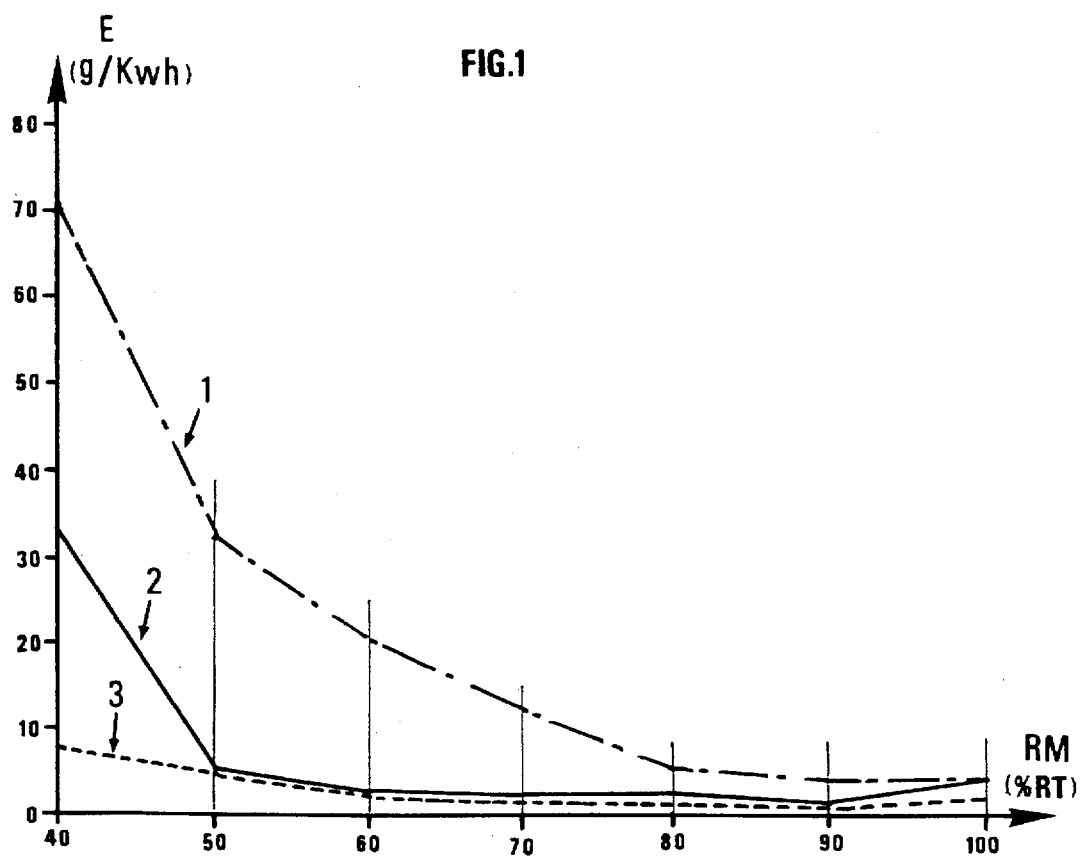
FIG. 1 shows curves defined by hydrocarbon emissions as a function of the engine speed, according to the prior art and according to the invention, FIG. 2 relates to ignition advance curves as a function of the engine load, according to the prior art and according to the invention.

FIG. 1 shows curves defined by hydrocarbon emissions E (in g/kWh) as a function of the engine speed RM (expressed in % of the maximum engine speed RT).

Curve (1) is obtained according to the prior art, for example for an engine according to French patent FR-2,575, 522 with pneumatic fuel injection. The maximum emissions obtained here for engine speeds of about 40% of the maximum speed are below 70 g/kWh and become less than 10 g/kWh for engine speeds above 70% of the maximum speed. This globally represents values 5 to 10 times less than the values obtained for conventional two-stroke (carburetor) engines.

Curve (2) shows these HC emissions by applying the process according to the invention, i.e. without a specific catalyst or change in the structure of the exhaust system of the engine.

Curve (3) shows the emissions level that can be obtained by adding a high-efficiency oxidation catalyst to the engine according to curve (1).

The slight differences between the second and the third curve (2) and (3) show the relevance of the process according to the invention, notably for the highest engine speeds. In fact, without the complexity linked with the addition of a catalyst, the emissions level is quite comparable, especially for high engine speeds.

Figure 2:
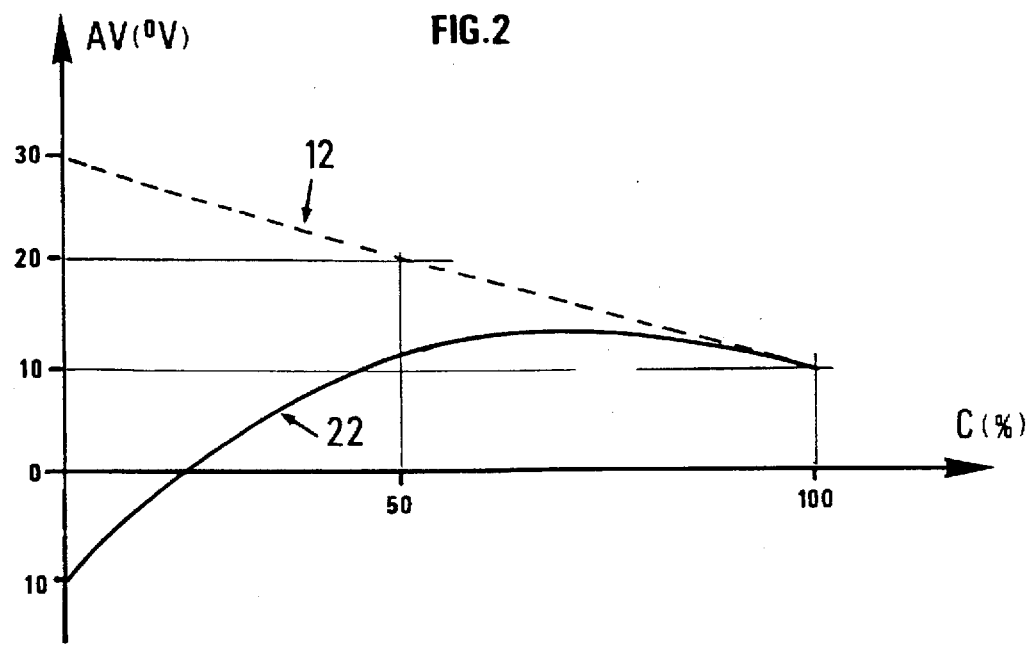

FIG. 2 relates to the ignition advance as a function of the load C of the engine expressed in % of the maximum load. In this figure, curve 12 (in dotted line) represents a conventional ignition-timing adjustment curve, whereas curve 22 (in solid line) corresponds to an adjustment according to the invention.

FIG. 2 shows that, for high loads, the engine regains the optimum ignition advance allowing to obtain the maximum performances and torque available. On the other hand, when the load lessens and the temperature of the exhaust gases consequently decreases, the advance is then increasingly delayed so as to maintain a sufficient exhaust gas temperature for the post-oxidation of the hydrocarbons and of the carbon monoxide. Thus, for the lowest loads, the advance can be delayed to the point where ignition occurs after the top dead center.

Figure 3:
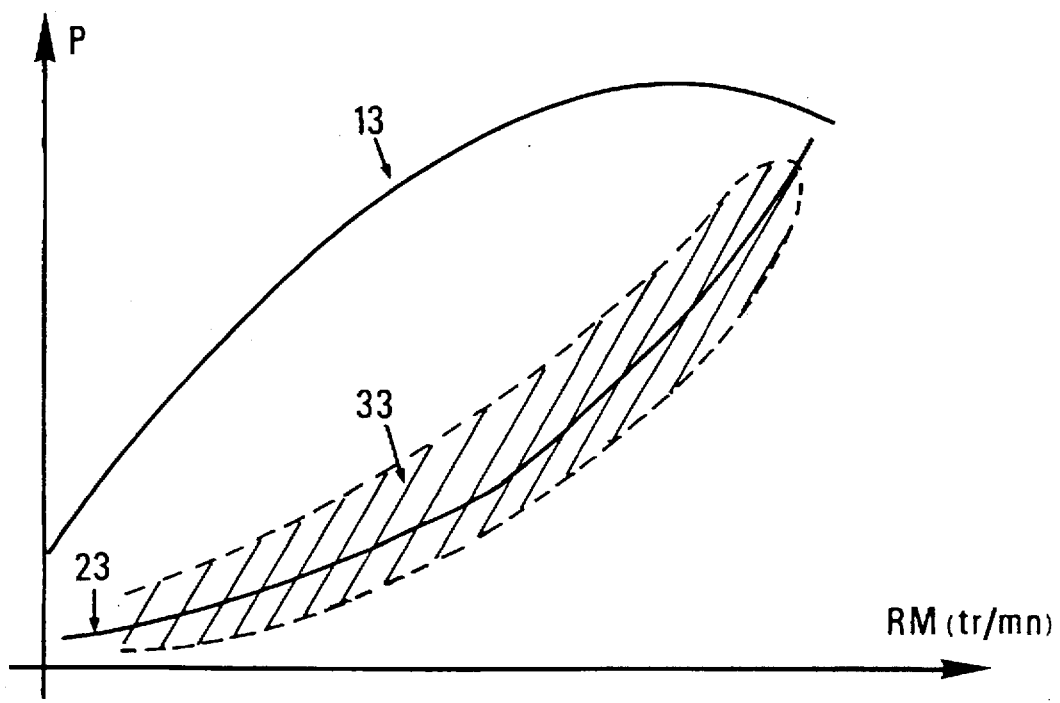
FIG. 3 illustrates operating curves according to the invention of an outboard type marine engine.
Figure 4:
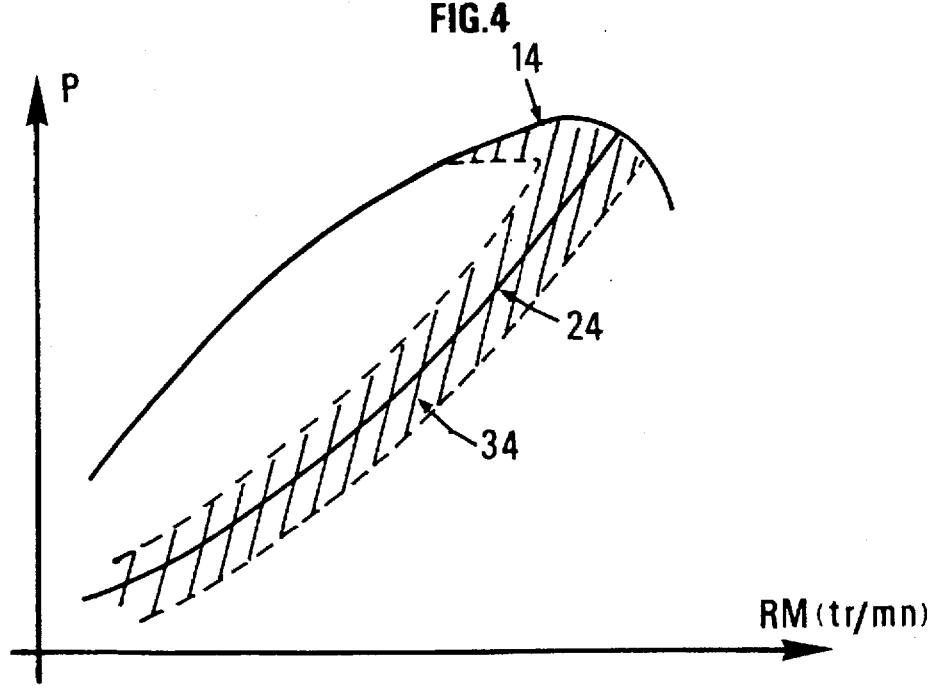
FIG. 4 shows operating curves according to the invention of a two-stroke engine for (two-wheeler) vehicles not provided with gearboxes, and FIG. 5 relates to operating curves according to the invention of a two-stroke engine for two-wheeler vehicles equipped with gearboxes.
Figure 5:
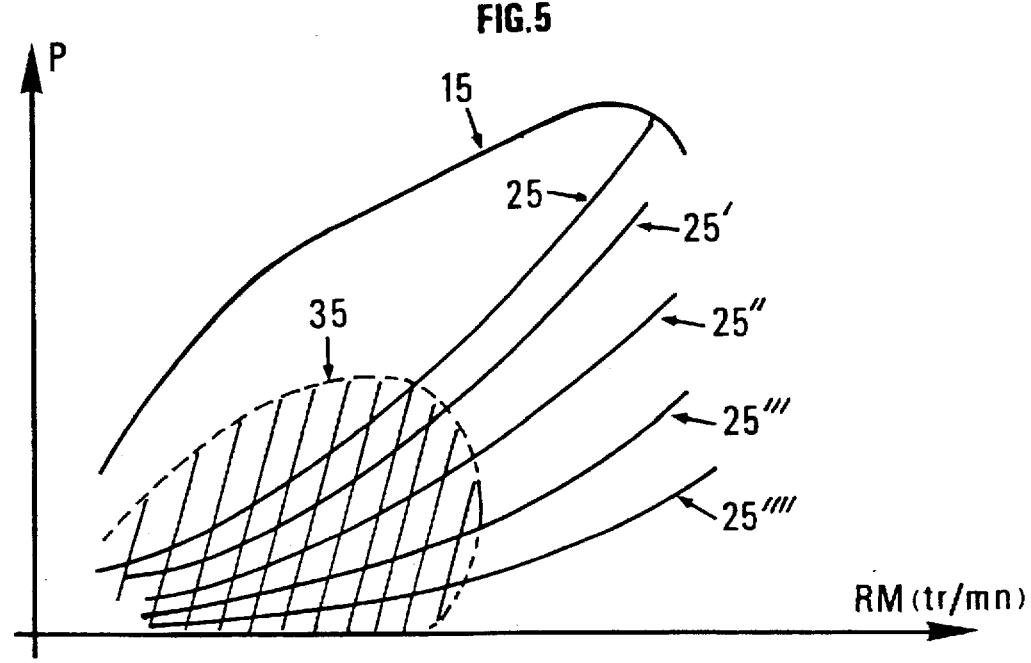

FIGS. 3, 4 and 5 illustrate each curves relative to the power of an engine as a function of the speed thereof.

FIG. 3 relates to an outboard type marine engine. Curve 13 is the maximum allowable power curve as a function of the engine speed. Curve 23 is the boat operating curve at stabilized speed. The hatched area 33 delimits the "space" where the invention is implemented and where a post-oxidation is created. The curve that is really used is determined inside area 33 as a function of the propeller selected for driving the boat.

Knowing that (current and planned) regulations about pollutant emissions are all centred on the values around the boat stabilized-speed operating curve 23, the present invention allows the engines in which it is used to meet the most stringent standards. The stabilized speed of the vehicle can be detected by any well-known means, especially via an electronic control of the engine.

FIG. 4 relates to an application of the invention to two-stroke engines of two-wheeler vehicles comprising no gearbox. As in the previous application, it is in the hatched area 34 surrounding the stabilized-speed operation of the two-wheeler vehicle (curve 24) that the invention is preferably implemented. Furthermore, post-oxidation is achieved here around the maximum powers and speeds which correspond to the main operating range of the vehicle.

FIG. 5 relates to an application of the invention to two-stroke engines of vehicles equipped with gearboxes. Curves 25 and 25' correspond to operations with the various gear ratios used. The hatched area 35, that corresponds to the most commonly used operating range, is the area in which the invention is implemented. Area 35 comprises the working points taken into account in the standard pollutant measuring cycles such as, for example, the cycle ECE R40.

The main advantage of the present invention lies in that the engine in which the invention is implemented can run, outside the post-oxidation area (33, 34, 35), at maximum torque and power.

Post-oxidation can be obtained by a mechanical and/or electronic control means regulated, for example, by the exhaust gas temperature. This feature is particularly interesting when the post-oxidation leads to very high exhaust gas temperatures harmful to the engine environment and to the exhaust in the vehicle.

All that has been written before shows that advanced ignition delay is a predominant parameter for post-oxidation control. However, associating the control of one or several secondary parameter(s) therewith in order to improve the process effectiveness, in particular by means of suitable electronics, is not excluded. These secondary parameters can be, for example, the air/fuel ratio admitted, the injection time duration for an injection engine.

Finally, it should be reminded that the present invention does not apply to engines supplied with a homogeneous air-fuel mixture since then, in case of a rich-mixture operation, the exhaust gas does not contain enough oxygen to oxidize all the unburned hydrocarbons.

I claim:

1. A two-stroke internal-combustion engine depollution process comprising scavenging burned gases from the combustion chamber using a gas comprising air, separating and delaying delivery of fuel in relation to gas comprising air used for scavenging the burned gases, advancing ignition as a function of load at least over a portion of the operating range of the engine, and delaying the advanced ignition over a portion of the operating range from the optimal advanced ignition, wherein said delay in relation to the optimal advanced ignition allows an increase in exhaust gas temperature and a post-oxidation of unburned hydrocarbons contained in said exhaust gases, and wherein said delay is at a maximum for low loads.

2. A depollution process as claimed in claim 1, wherein said delay is achieved in an operating range of the engine for which the vehicle driven by said engine is at stabilized speed.

3. A depollution process as claimed in claim 1, further comprising a step of varying the air/fuel ratio or the injection time of the fuel in relation to said delay.

4. A depollution process as claimed in claim 1, wherein said delay is controlled mechanically.

5. A depollution process as claimed in any one of claims 1 to 3, wherein said delay is controlled electronically.

6. A depollution process as claimed in claim 5, wherein said electronic control is regulated by the exhaust gas temperature.

7. A depollution process as claimed in claim 1, wherein said process is applied to an engine of a two-wheeler vehicle having a no gearbox, wherein the process is implemented close to maximum power and for high engine speeds.

8. A depollution process as claimed in claim 1, wherein said process is applied to an engine of a two-wheeler vehicle having a multiple-gear ratio gearbox, wherein said process is mainly implemented for low speeds and powers corresponding to a particular use of the vehicle.

9. A depollution process as claimed in claim 1, wherein said process consists essentially of the steps set forth therein.

10. A depollution process as claimed in claim 1, wherein said delay approaches zero for high loads.

11. A depollution process as claimed in claim 1, wherein said post-oxidation is achieved without the use of a specific catalyst at the exahust.

* * * * *